No. 618,165. Patented Jan. 24, 1899.
T. F. CARLISLE.
MANUFACTURE OF SEAMLESS COMPOUND WIRE.
(Application filed Dec. 27, 1897.)

(No Model.)

WITNESSES.
Charles T. Hannigan.
Arthur E. Alden

INVENTOR.
Thomas F. Carlisle
By Horatio E. Bellows
Atty.

UNITED STATES PATENT OFFICE.

THOMAS F. CARLISLE, OF PROVIDENCE, RHODE ISLAND, ASSIGNOR TO THE NELSON IMPROVED SEAMLESS FILLED WIRE COMPANY, OF SAME PLACE.

MANUFACTURE OF SEAMLESS COMPOUND WIRE.

SPECIFICATION forming part of Letters Patent No. 618,165, dated January 24, 1899.

Application filed December 27, 1897. Serial No. 663,661. (No specimens.)

*To all whom it may concern:*

Be it known that I, THOMAS F. CARLISLE, of the city and county of Providence, State of Rhode Island, have invented certain new and useful Improvements in Methods of Manufacturing Seamless Compound Wire, of which the following is a specification.

My invention relates more particularly to the construction of the ingot from which seamless compound wire is reduced. Former processes for the manufacture of such wire require the use of an outer shell of precious metal, a base-metal core, and a cumbersome method of applying solder between these two members, or a process of sweating, in order to form the solid ingot. By all methods now in use it is found impossible to construct an ingot with an outer wall so thin as to produce the lowest quality of plated wire, while the quality of the product is often lowered by the blistering or expansion of the ingot-shell during the application of the solder. The latter result tends to force the shell from the core.

Figure 1:
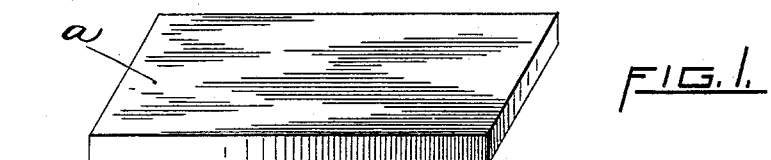
Figure 2:
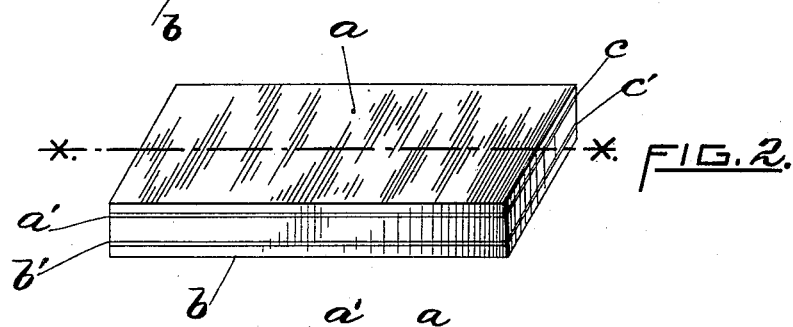
Figure 3:
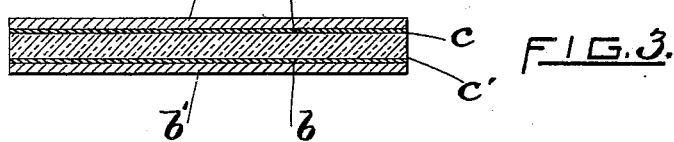
Figure 4:
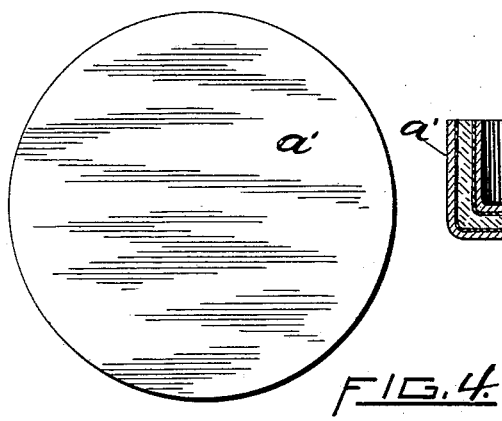
Figure 5:
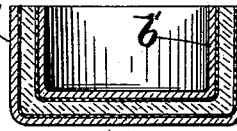
Figure 6:
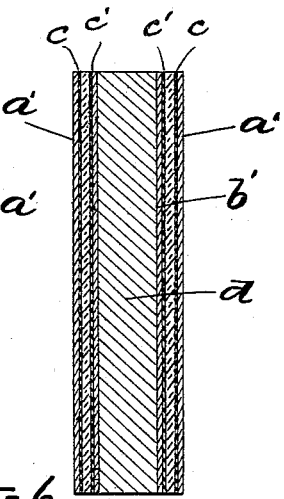

Referring to the accompanying drawings, which form a part of this specification, Figure 1 is a flat ingot of base metal in perspective. Fig. 2 is a perspective view of the flat ingot after the application of the plating metal and solder. Fig. 3 is a sectional view of the same on the line X X. Fig. 4 is a plan view of the disk struck from the compound flat ingot. Fig. 5 is a sectional view of the cup with a plated exterior. Fig. 6 shows in section the tube reduced from the cup into which the core is inserted.

In practicing my invention I prepare a flat ingot of base metal, Fig. 1, for plating and flux the upper and lower surfaces $a$ and $b$. I then place upon the surface $a$, Figs. 2 and 3, a sheet of gold $a'$, with a thin sheet of solder $c$ between the two surfaces, and upon the lower surface $b$ I apply a sheet of hard solder $b'$, with a sheet of soft solder $c'$ between it and the flat ingot, and clamp the strips firmly by any convenient means and subject the mass to heat sufficient to fuse the solder $c$ and $c'$. This compound flat ingot is next unclamped and reduced in thickness and extended laterally by passing through a rolling-mill. A disk is then cut therefrom, Fig. 4, which is cupped up, Fig. 5, in a press commonly used for this purpose, whose essential feature is a male plunger forcing the metal into a cylindrical female die. The precious metal is on the outer surface of the cup, while the hard solder covers the inner surface. The cup is then drawn into a tube of any desired length, Fig. 6, and the base-metal core $d$ inserted therein after its surface and the inner tube surface have been fluxed. This compound ingot is subjected to sufficient heat to fuse the hard solder $b$ and is then ready to be reduced to seamless wire of any desired dimensions by the usual methods.

Having described my improved process, what I claim as new, and desire to secure by Letters Patent, is—

The improved process herein described of making seamless compound wire, consisting in fluxing both sides of a flat base-metal ingot, and covering each surface with a sheet of soft solder; placing upon one solder sheet a strip of fine metal, and upon the other solder sheet a strip of hard solder, subjecting these layers to heat sufficient to fuse the soft solder; rolling the compound flat ingot; cutting a disk therefrom; then cupping said disk in a press; elongating the sides of said cup into a tube; inserting within the tube a base-metal core, after the contiguous surfaces have been fluxed; heating the ingot to fuse the hard solder therein; and then reducing the ingot to wire according to any of the usual methods.

In witness whereof I have hereunto set my hand in the presence of the subscribing witnesses.

THOMAS F. CARLISLE.

Witnesses:
F. J. LAIRD,
JOHN J. BELLOWS.